United States Patent
Gross

(10) Patent No.: US 9,202,241 B2
(45) Date of Patent: Dec. 1, 2015

(54) SYSTEM AND METHOD OF DELIVERING CONTENT BASED ADVERTISING

(75) Inventor: John Nicholas Gross, San Francisco, CA (US)

(73) Assignee: John Nicholas and Kristin Gross, Berkeley, CA (US), Trust U/A/D April 13, 2010

( * ) Notice: Subject to any disclaimer, the term of this patent is extended or adjusted under 35 U.S.C. 154(b) by 1314 days.

(21) Appl. No.: 11/565,352

(22) Filed: Nov. 30, 2006

(65) Prior Publication Data

US 2008/0010270 A1 Jan. 10, 2008

Related U.S. Application Data

(60) Provisional application No. 60/741,163, filed on Nov. 30, 2005.

(51) Int. Cl.
*G06F 7/00* (2006.01)
*G06F 17/30* (2006.01)
*G06Q 30/06* (2012.01)

(52) U.S. Cl.
CPC ...... *G06Q 30/0601* (2013.01); *G06F 17/30867* (2013.01)

(58) Field of Classification Search
CPC .............. G06F 17/30; G06F 17/30867; G06Q 30/0601
See application file for complete search history.

(56) References Cited

U.S. PATENT DOCUMENTS

| | | |
|---|---|---|
| 6,081,788 A | 6/2000 | Appleman et al. |
| 6,269,361 B1 | 7/2001 | Davis et al. |
| 6,285,999 B1 | 9/2001 | Page |
| 6,574,624 B1 | 6/2003 | Johnson et al. |
| 7,007,074 B2 | 2/2006 | Radwin |
| 7,346,606 B2 | 3/2008 | Bharat |
| 7,437,368 B1 | 10/2008 | Kolluri et al. |
| 7,451,099 B2 | 11/2008 | Henkin et al. |
| 7,548,915 B2 | 6/2009 | Ramer et al. |
| 7,818,208 B1 | 10/2010 | Veach |
| 8,090,706 B2 | 1/2012 | Bharat |
| 8,140,965 B2 | 3/2012 | Dean et al. |
| 8,156,128 B2 | 4/2012 | Ramer et al. |
| 8,260,664 B2 | 9/2012 | Vadlamani et al. |
| 8,326,689 B2 | 12/2012 | Agarwal et al. |
| 8,392,249 B2 | 3/2013 | Koningstein et al. |
| 2001/0039510 A1 | 11/2001 | Galomb |
| 2002/0052674 A1 | 5/2002 | Chang et al. |

(Continued)

OTHER PUBLICATIONS

Stata, R. et al., "The Term Vector Database: fast access to indexing terms for Web pages," http://www9:org/w9cdrom/159/159.html, available on web May 23, 2000, 11 pages.

(Continued)

*Primary Examiner* — Azam Cheema

(74) *Attorney, Agent, or Firm* — J. Nicholas Gross; Law Office of J. Nicholas Gross, P.C.

(57) ABSTRACT

A system and method is disclosed for presenting relevant advertising to user search queries. The ads can be selected by reference to an underlying content presented in organic search results. The ads can be combined and supplemented with conventional keyword/pay for placement type services to improve ad performance. The system can also be used for testing content related ads in advance of their presentation to potential third party partners in an advertising campaign.

24 Claims, 8 Drawing Sheets

(56) References Cited

U.S. PATENT DOCUMENTS

| | | |
|---|---|---|
| 2003/0046161 A1 | 3/2003 | Kamangar et al. |
| 2003/0191653 A1 | 10/2003 | Birnbaum et al. |
| 2004/0054573 A1 | 3/2004 | Shah et al. |
| 2004/0059708 A1 | 3/2004 | Dean et al. |
| 2004/0107137 A1 | 6/2004 | Skinner |
| 2004/0186776 A1 | 9/2004 | Llach |
| 2004/0225562 A1 | 11/2004 | Turner |
| 2005/0055271 A1 | 3/2005 | Axe et al. |
| 2005/0071325 A1 | 3/2005 | Bem |
| 2005/0131758 A1 | 6/2005 | Desikan et al. |
| 2005/0131762 A1 | 6/2005 | Bharat |
| 2005/0144069 A1 | 6/2005 | Wiseman et al. |
| 2005/0165615 A1 | 7/2005 | Minar |
| 2005/0222989 A1 | 10/2005 | Haveliwala et al. |
| 2005/0267872 A1 | 12/2005 | Galai et al. |
| 2005/0283464 A1* | 12/2005 | Allsup et al. ............ 707/3 |
| 2006/0064339 A1* | 3/2006 | Allred ............... 705/9 |
| 2006/0069784 A2 | 3/2006 | Hsu et al. |
| 2006/0095322 A1* | 5/2006 | Dierks ............ 705/14 |
| 2006/0167749 A1 | 7/2006 | Pitkow et al. |
| 2006/0173985 A1 | 8/2006 | Moore |
| 2006/0277102 A1 | 12/2006 | Agliozzo |
| 2007/0005417 A1* | 1/2007 | Desikan et al. ............ 705/14 |
| 2007/0050389 A1* | 3/2007 | Kim et al. ............ 707/101 |
| 2007/0061297 A1* | 3/2007 | Bihun et al. ............ 707/3 |
| 2007/0061363 A1* | 3/2007 | Ramer et al. ............ 707/104.1 |
| 2007/0088609 A1 | 4/2007 | Reller et al. |
| 2007/0100836 A1* | 5/2007 | Eichstaedt et al. ............ 707/10 |
| 2007/0112735 A1 | 5/2007 | Holloway et al. |
| 2007/0255702 A1 | 11/2007 | Orme |
| 2008/0065631 A1 | 3/2008 | Baeza-Yates et al. |
| 2008/0103884 A1 | 5/2008 | Blinnikka et al. |
| 2008/0103899 A1 | 5/2008 | Blinnikka et al. |

OTHER PUBLICATIONS

Poremsky, Diane; "Google and Other Search Engines: Visual Quickstart Guide," Peach pit Press, May 2004, 13 pages.

Giguere, Eric; "Making Easy Money with Google: Using the Adsense Advertising Program," Peach pit Press, Jun. 2005, 11 pages.

Calishain, Tara; "Web Search Garage," Prentice Hall, Aug. 2004, 18 pages.

* cited by examiner

FIGURE 3 - PRIOR ART
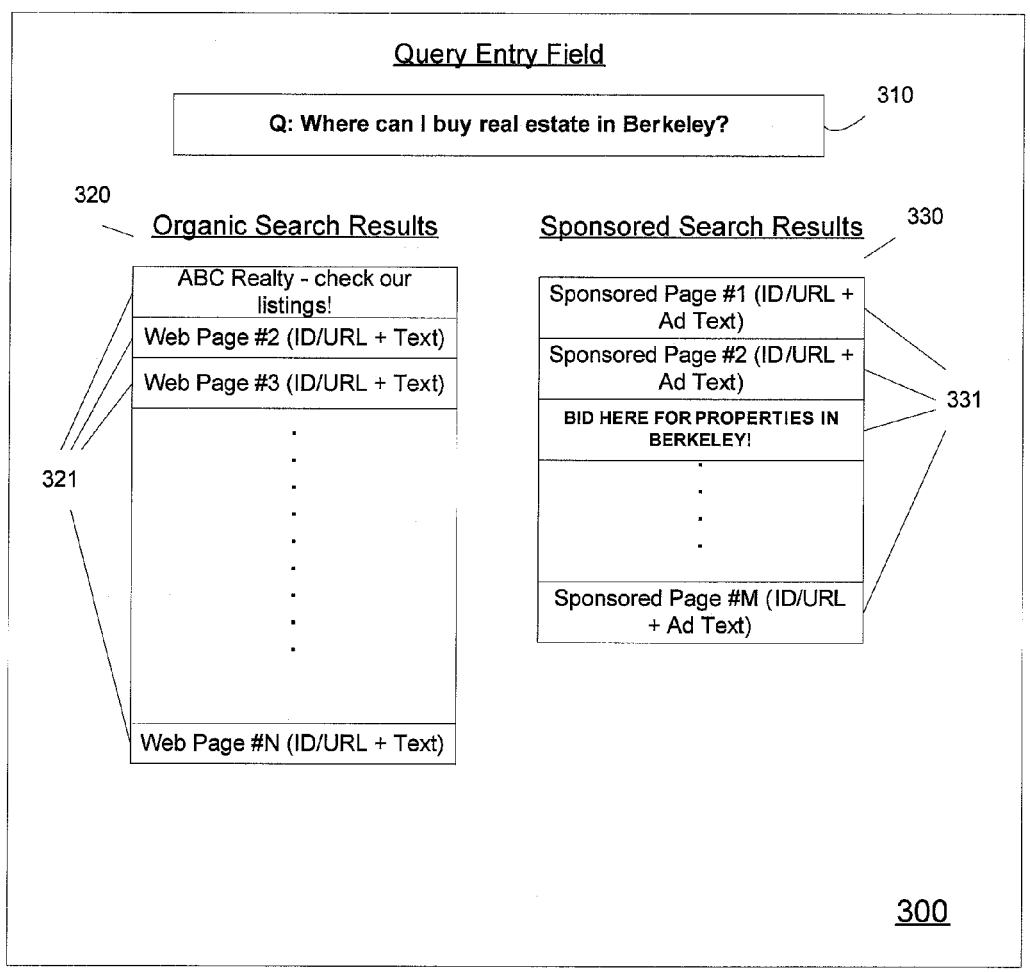

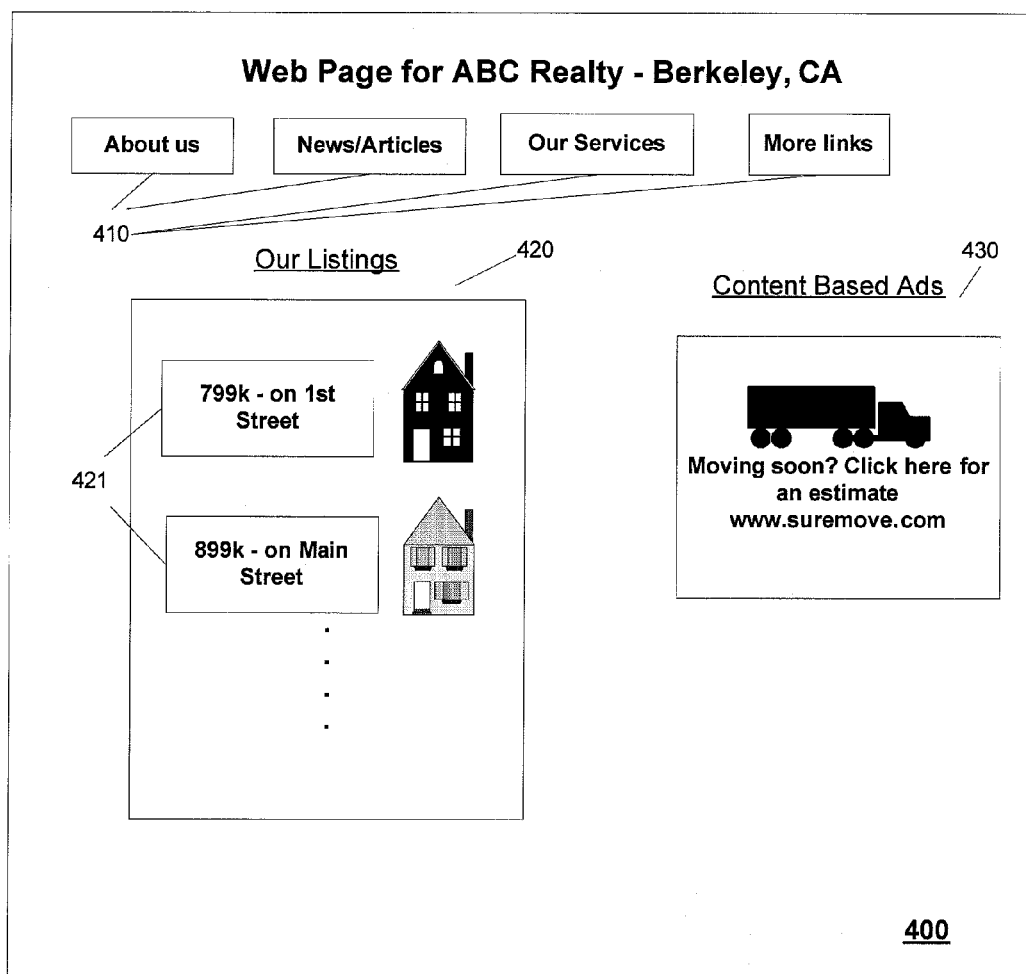
FIGURE 4A - PRIOR ART

FIGURE 4B - PRIOR ART
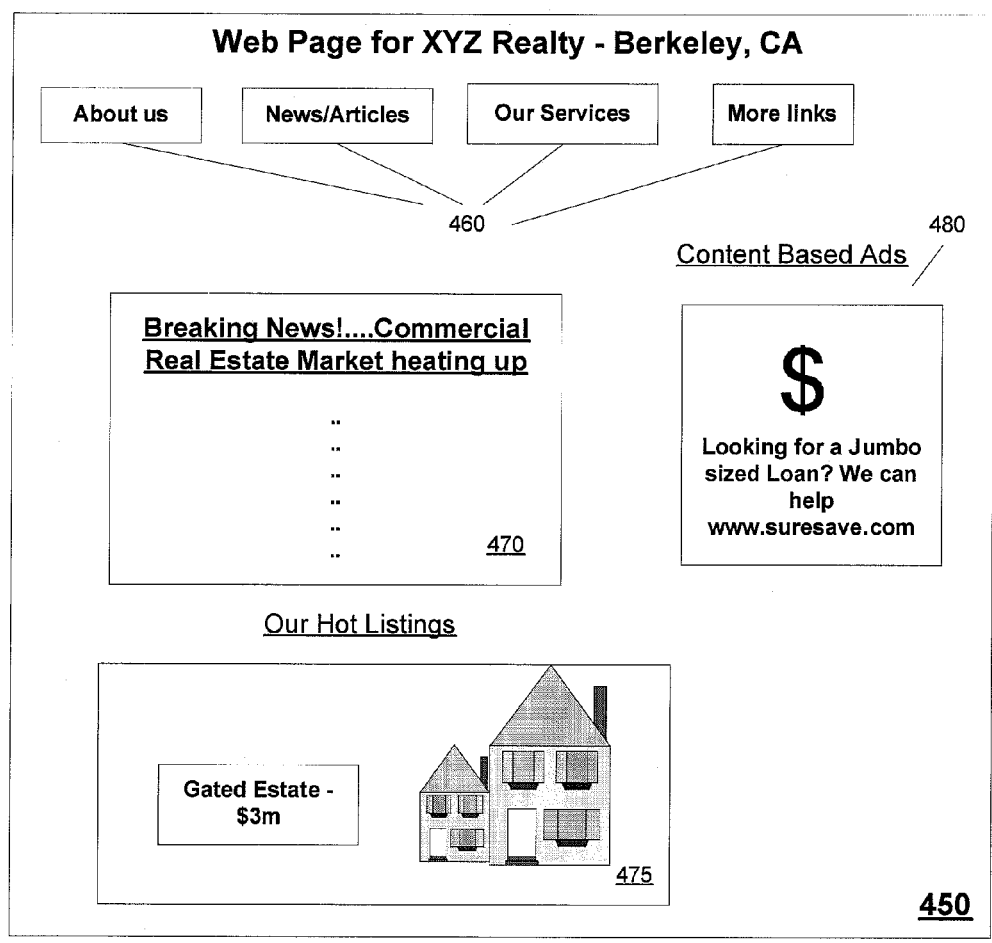

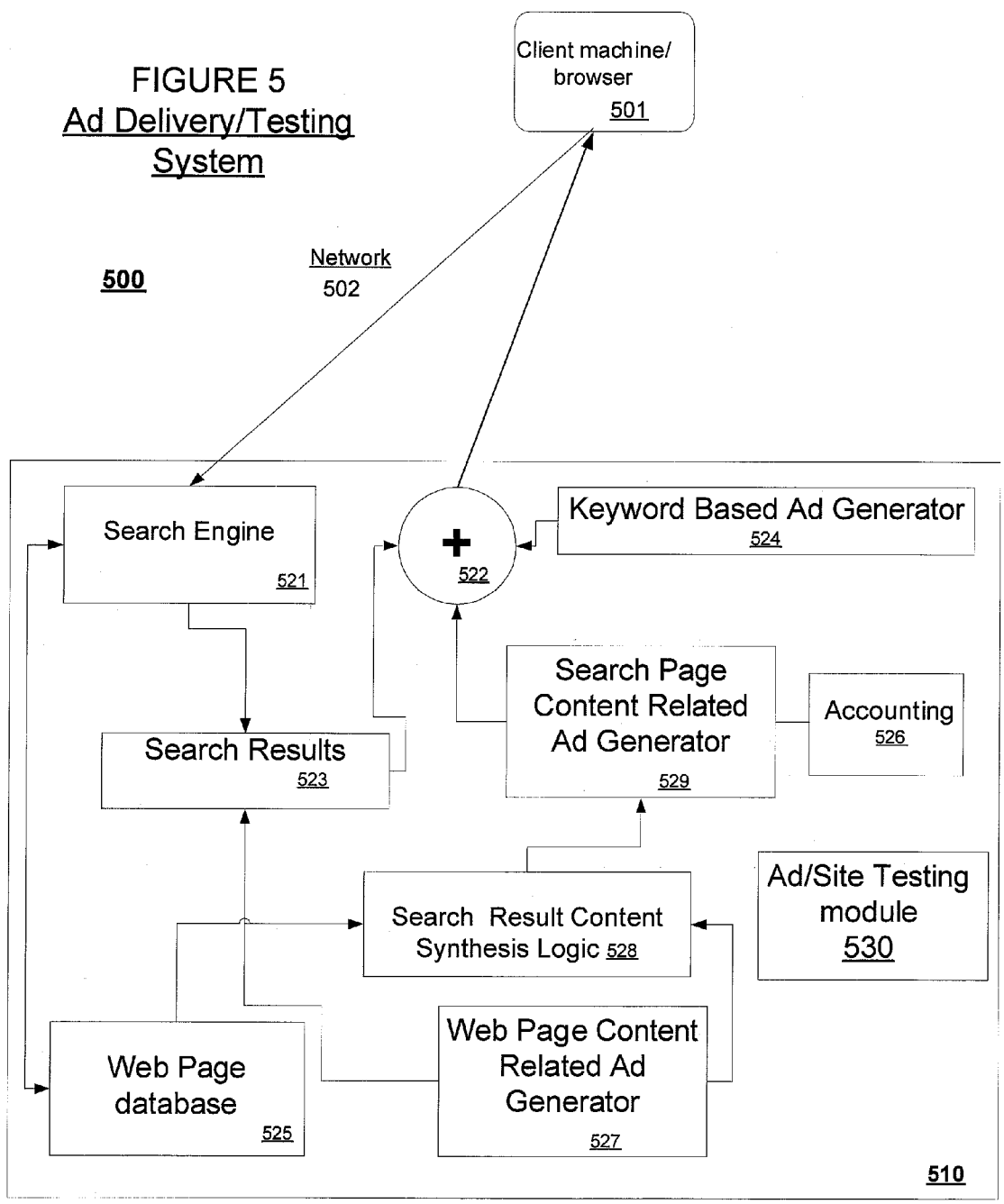

SYSTEM AND METHOD OF DELIVERING CONTENT BASED ADVERTISING

RELATED APPLICATION DATA

The present application claims the benefit under 35 U.S.C. 119(e) of the priority date of Provisional Application Ser. No. 60/741,163 filed Nov. 30, 2005 which is hereby incorporated by reference.

FIELD OF THE INVENTION

The present invention relates to providing electronic advertising to online users, and particularly to delivering content relevant advertisements within a conventional Internet based search query interface or similar interface.

BACKGROUND

Electronic ad serving systems are well-known in the art, with perhaps the most famous and successful (at this time) being the Google Adwords and Adsense programs. The goal of such systems generally is to ensure that advertising material is more closely tailored to the particular interests/needs of online users who are performing searches and/or perusing content at various websites.

The prior art "Adwords" system used by Google allows advertisers to bid and participate in an auction for "keywords" (and in some cases semantic variants) expected to be presented by users searching for information on the Internet. For example, an advertiser may elect to bid $1 for the right to present ads within the Google search interface whenever a search is performed concerning real estate in certain locales in California. These ads then appear in the search pages in a so-called "sponsored link" area to allow users to distinguish them from so-called "organic" search results. A similar system originated by Overture described in U.S. Pat. No. 6,269,361 (incorporated by reference herein) operates under a similar principle and allows advertisers to compete for user attention within a search interface.

The operation of the Adwords system, from the user perspective, is depicted at FIG. 3 and works generally as follows: within a search interface 300, a user enters a search query within an entry field 310, in this instance the request is "Where can I buy real estate in Berkeley." The query is handled in a well-known fashion to retrieve (preferably multiple) individual relevant search results 321 presented within an "organic" search area 320. For more information on how search results are generated, please see U.S. Pat. No. 6,285,999 which is incorporated by reference herein. The search result entries 321 typically include at least an identifier usable by a browser (i.e., such as a URL) for clicking through to such site, as well as additional information, such as context text excerpted from the webpage to denote the correlation to the user query. These short extracted blurbs help the user to gauge the relevancy of the search result before requiring the user to click through and check the contents of the webpage.

As alluded to above, the search interface 300 also includes a Sponsored Search Results area 330, in which ads 331 sponsored by advertisers are presented along with the search results. The mechanism by which such ads are presented is well known and discussed at length at Google's website as well as in U.S. Patent Publication No. 2005/0071325 to Bem which is hereby incorporated by reference. The ads 331 typically include some descriptive text and a URL to allow click-through. Note that in some instances some of the sponsored link ads 331 can be blended with the organic search results, such as by placing them at the top of area 320 to increase their visibility. It will be understood by those skilled in the art that the above is merely an illustration and in actual practice the placement, format, etc. of the various portions of interface 300 may vary significantly from that shown.

One limitation of the prior art Adwords scheme nonetheless is that it allows advertisers to bid on keywords which may have nothing to do in fact with the user's query, or worse, may have nothing to do with the advertiser's actual business. In other words, some of the sponsored link ads 331 are only marginally relevant to the user's query 310, but they are presented because such advertisers have bid a significant premium to have such listings posted in area 330. This is referred to as "over-serving" of ads and can lead to frustrating experiences by users who click on such ads, only to find out the resulting web pages of advertising are not really related to their query. The effect is exacerbated because some "mask" the true nature of their sites through the use of advertising language which appears to mimic the search result. An example of this is shown in FIG. 3, where, for example, a Sponsored Link in the number 3 position is in fact an ad for online auctioneer, an e-commerce bookstore, or some other similarly unhelpful link. Google has attempted to remedy part of this problem through the use of its so-called Adsbot program, which purportedly studies the landing pages of advertisers to determine the relevance of such ads to keywords. However the reality is that this merely affects/adjusts the ranking of ads within the interface, and does not eliminate them from presentation to the user.

In contrast to the Adwords system, the Google Adsense program purportedly identifies, selects and presents ads on third party sites which are tailored to the content of a page being viewed by the user. A description of such system can be found in U.S. Publication No. 2004/0059708 to Dean et al. which is also incorporated by reference herein. An example of how such system works is shown generally in FIGS. 4A and 4B. For example, as shown in FIG. 4A, a web page 400 for ABC Realty includes a number of conventional links 410 as well as a content presentation area 420, in this instance, real estate listings 421. A "content" related ad 430 selected for such page 400, for example, may include an ad for a moving service. This ad is selected based on the fact that the content of page 400 (which may include other metadata not shown, and/or be based on other factors identified in Dean et al) would be correlated to a topic entry for real estate for example. Since persons purchasing new housing typically employ moving services as well, this system significantly improves the user experience by presenting advertising which is in fact more closely related to their particular needs or interests.

A similar example is shown in FIG. 4B; in this instance a web page a web page 450 for XYZ Realty includes a number of conventional links 460 as well as one or more content presentation areas 470, 475 which in this instance include relevant commercial real estate news 471 and real estate listings 421. A "content" related ad 480 selected for such page 450, for example, may include an ad for a lender offering Jumbo loans (i.e., over a certain dollar amount, such as $1 m). This ad is selected based on the fact that the content of page 450 (which may include other metadata not shown, and/or be based on other factors identified in Dean et al) would be correlated to a topic entry for "commercial" real estate for example, which would typically require a significant loan in this locale. Again it will be understood by those skilled in the art that the above is merely an illustration and in actual practice the placement, format, etc. of the various portions of interfaces 400, 450 may vary significantly from that shown.

As can be seen above, the Google Adsense program is superior from a relevancy perspective over Adwords, but, to the applicant's knowledge, the techniques in the former therein have not been extended to the actual Google initial search page itself. In other words, to date, Applicant's review of the prior art reveals that prior art search pages do not consider the content of the retrieved links/web pages in presenting advertising within the search page, at least as explained herein. Such extension, as noted below, materially benefits users, advertisers and search engine operators by presenting more relevant and useful ads at the earliest point of contact with the user. In addition, this approach can have the benefit of ameliorating "under-serving" of ads in situations where advertisers have not properly appreciated the value of certain keywords which nonetheless may be prevalent in both user queries and content relevant websites.

SUMMARY OF THE INVENTION

An object of the present invention, therefore, is to overcome the aforementioned limitations of the prior art;

Another object is to provide a system/method for providing online advertising within a search page which considers the content of retrieved results as a factor in selecting appropriate ad materials;

Another object is to provide a system/method for providing online advertising within a search page using a blend of keyword targeting and retrieved content as factors in selecting appropriate ad materials;

Yet another object is to provide a system/method for assisting web site operators in extending the reach/effect of their content so as to affect search engine advertising materials;

Another object is to provide a system/method for assisting ad delivery operators to reduce over-serving and under-serving of ads by search engine operators;

A further object is to provide a system/method for assisting ad delivery operators to identify, evaluate and/or rate advertising performance of content related ads, including for the purpose of identifying potential partners, advertisers, etc.

It will be understood from the Detailed Description that the inventions can be implemented in a multitude of different embodiments. Furthermore, it will be readily appreciated by skilled artisans that such different embodiments will likely include only one or more of the aforementioned objects of the present inventions. Thus, the absence of one or more of such characteristics in any particular embodiment should not be construed as limiting the scope of the present inventions. Furthermore, while the inventions are presented the context of certain exemplary embodiments, it will be apparent to those skilled in the art that the present teachings could be used in any application where it would be desirable and useful to evaluate content characteristics as part of rendering online advertising.

A first aspect of the invention concerns a method of determining advertising information comprising the steps of: identifying search results corresponding to a search query; wherein the search results include data associated with one or more electronic documents from one or more webpages; analyzing at least a first one of the one or more electronic documents to identify a set of one or more topics associated therewith; and identifying an advertisement relevant to the at least first one of the one or more electronic documents based on the set of one or more topics.

In preferred embodiments the search query is generated automatically based on content and/or links of a webpage. Typically the search query is initiated by a user within a search interface.

In RSS implementations the search query can be generated automatically based on content of an RSS feed.

Generally the search results are presented with the advertisement along with keyword ads and/or pay for placement ads within the search interface. The search query can be adapted for locating relevant data in web logs (Blogs) and/or RSS feeds. For some situations a keyword based ad may also be presented based on the topics identified for the search result listing page(s). The advertisement is preferably displayed within a search interface.

In some implementations the performance of the advertisement and/or the underlying web pages from the search can be measured based at least in part on user interaction with the advertisement. For different campaigns a set of advertisements associated with a particular webpage can be tested to determine a performance and/or ranking for individual ones of the advertisements. To determine this set of advertisements associated with a particular webpage are presented within a search interface without the presence of other advertisements. Furthermore the set of advertisements associated with a particular webpage can be presented on a query-by-query basis as part of an advertising test campaign, including by considering at least one or more of: a) an identity of a user; b) a time of day; c) a duration period of the advertising test campaign; d) user demographics; e) a topic of the query; f) other advertisements presented within a search interface.

Another aspect of the invention concerns a method of presenting advertising information within an electronic interface comprising: identifying search results corresponding to a search query; wherein the search results include references to one or more electronic documents from one or more webpages; analyzing the one or more electronic documents to identify a set of one or more topics associated with a collective content of a selected set of such documents; and presenting one or more advertisements within the electronic interface which is/are relevant to the set of one or more topics.

The collective content is preferably based on a term vector computed across the selected set of documents, but may be constituted by other known means.

Yet another aspect of the invention concerns a method of presenting advertising information within an electronic interface comprising: providing search results in response to a search query within a search webpage; wherein the search results include references to one or more separate webpages, and the webpages are maintained by one or more content site operators; determining whether an advertising relationship exists between an advertising system operator providing the search results and at least one of the one or more content site operators; and presenting at least one first advertisement based on the advertising relationship within the search webpage along with the search results, which at least first one ad is based on content of at least a first one of the one or more webpages. In this manner the search engine operator can selectively prefer/reward affiliates within an advertising network. This method could be extrapolated in some instances so that a second advertisement based on a second advertising relationship between an advertising system operator and a second one of the content site operators can be presented as well.

In most applications additional keyword or pay for placement ads can be presented within the search webpage at the same time.

Still another aspect of the invention deals with presenting advertising information to an electronic interface comprising the steps: providing search results in response to a search query within a search webpage; wherein the search results include references to one or more separate webpages; processing content extracted from selected ones of the one or more separate webpages to compile a separate pseudo web page; identifying one or more topics for the pseudo web page; presenting at least one first advertisement within the search page along with the search results based on the one or more topics. The pseudo page may be compiled dynamically or pre-compiled and stored for later/faster retrieval. As before in some preferred approaches the selected ones of the one or more separate webpages are determined by based on an existing advertising relationship between an advertising system operator and operators of the separate webpages.

A further aspect of the invention concerns a method of presenting advertising information to an electronic interface comprising: interacting with an online user within a first webpage; selecting a set of second webpages based on one more predefined criteria, and which predefined criteria use data derived at a time when the online user is interacting with the first webpage; presenting advertisements to the online user within the first webpage, which advertisements are determined by examining content derived from the second set of webpages.

Still another aspect concerns a method of testing advertising information within an electronic interface comprising: identifying one or more topic related advertisements; analyzing search results corresponding to one or more search queries to determine a first candidate set of individual webpages; and determining a performance rating for each of the individual webpages by examining a correlation between a presentation of each of the individual webpages and a user interaction with the one or more topic related advertisements. In this fashion an advertiser can test and evaluate the potential performance of a set of new ads against one or more webpages.

The webpages can then be sorted based on their performance. Followups in the form of automatic communications can be prepared and sent to operators of selected ones of the webpages based on a ranking of their performance.

A related aspect of the invention concerns a method of testing advertising information within an electronic interface comprising: identifying at least one target webpage; identifying a set of one or more individual topic related advertisements adapted for the at least one target webpage; and determining a performance rating for each of the individual topic related advertisements by examining a correlation between a presentation of the at least one target webpage within an interface and a user interaction with one or more of the individual topic related advertisements.

Still another aspect relates to a method of testing advertising information within an electronic interface comprising: identifying one or more topic related advertisements; identifying one or more target webpages; and determining a performance rating for both the target webpages and the topic related advertisements by examining a correlation between a presentation of the one or more target webpages and a user interaction with the one or more topic related advertisements.

A further aspect of the invention concerns a method of presenting advertising information within an RSS (Really Simple Syndication) feed comprising: identifying a first content in the RSS feed; generating a set of search results based on the first content; wherein the search results include references to one or more separate webpages; processing content extracted from selected ones of the one or more separate webpages to identify one or more topics; and presenting at least one first advertisement in connection with the RSS feed based on the one or more topics.

The first advertisement can be presented as part of the RSS feed and/or in a data channel outside of the RSS feed. The first advertisement can be further based on analyzing a plurality of RSS feeds selected for presentation within an RSS aggregator.

Another aspect of the invention relates to a system and method for identifying appropriate electronic advertising information for a search engine comprising: forming a website collective whose members include a plurality of different websites characterized by a common parameter including at least one of a common content topic and/or a common contractual arrangement; compiling content taken from webpages in the website collective to generate a synthetic document representing aggregated content from said different websites, and identifying an advertisement to be associated with said aggregated content by comparing content of said advertisement and said synthetic document.

Other aspects of the invention concern systems which are adapted with software modules/routines and other related hardware for performing the aforementioned methods above.

DESCRIPTION OF THE DRAWINGS

FIG. 3 is a depiction of a prior art search engine interface which delivers ads based on keyword selection;

FIGS. 4A-4B are depictions of prior art web page interfaces which delivers ads based on page content;

FIG. 5 illustrates a preferred embodiment of an advertising delivery/evaluation system constructed in accordance with the present invention.

DETAILED DESCRIPTION

Figure 1:
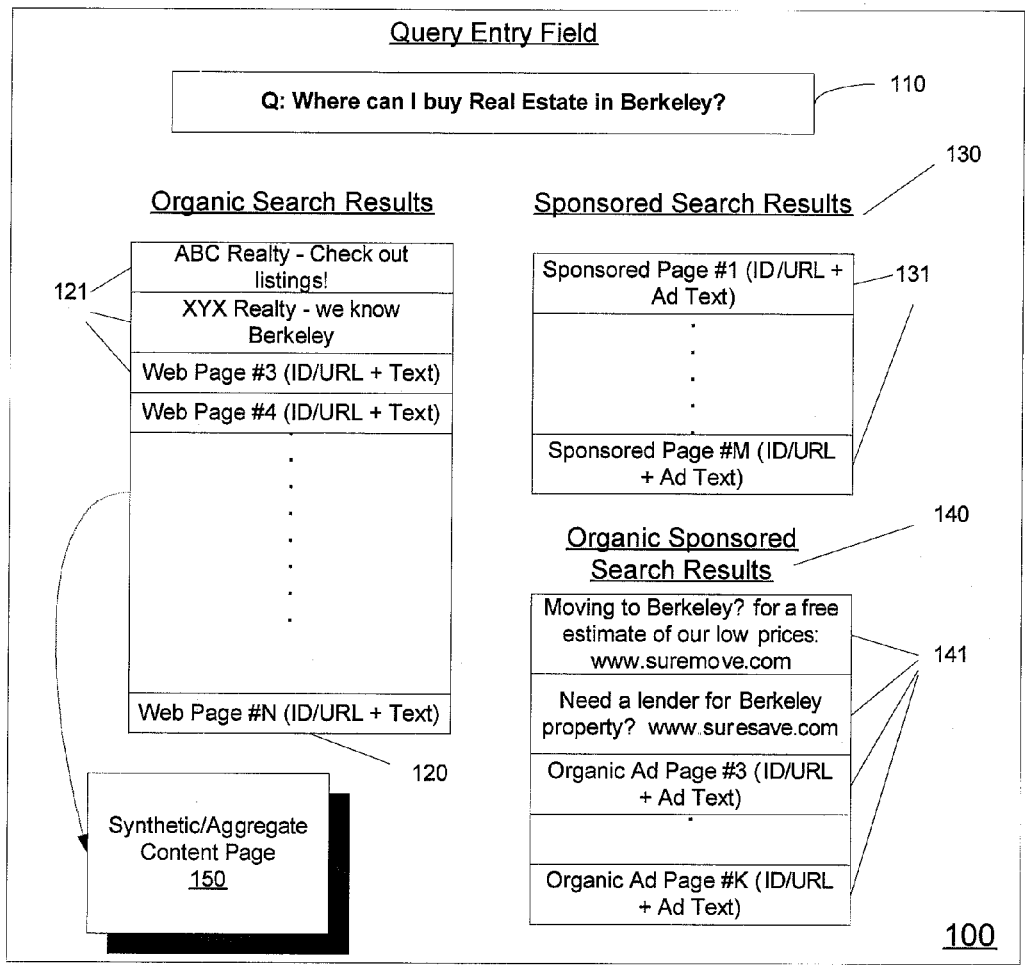
FIG. 1 illustrates a search/advertising delivery interface implemented in accordance with one exemplary embodiment of the present invention.

FIG. 1 illustrates an example of a search engine/ad delivery interface 100 employed in the present invention that is adapted for providing ads that are based at least in part on the content of related search results. While the present preferred embodiment is directed to a dedicated search engine service, it will be understood by those skilled in the art that it is nonetheless applicable in general to any web page which includes a search feature.

During an interactive session with a user over a network (such as the Internet), search engine/ad delivery interface 100 is generated under control of a search engine provider (such as discussed above in connection with FIGS. 3 and 4A, 4B) as a World Wide Web (WWW) web page and presented within a client device (i.e., some form of computing system) within a browser software program. The details of such servers, client devices, browsers, and WWW page codings are well known, and are not material to the present invention. Those skilled in the art will appreciate that any number of combinations of such elements will interoperate with the present invention.

Interface 100 includes a number of viewable fields presented to a user for searching and visualizing query results and advertising information. As is apparent, like referenced figures in FIG. 1 are intended to signify like elements already identified in FIG. 3 unless otherwise noted. These include, in this instance four primary areas:

- a first display area 110 for receiving a user query; this information can be input by the user by any conventional I/O device, including a keyboard, a mouse, a recognized speech query, etc.;
- a second display area 120 for displaying so-called "organic" search results; these represent individual relevant search results 121 presented based on a Pagerank algorithm or similar well-known algorithm as noted above;
- a third display area 130 for displaying so-called "sponsored" search results, which, as noted above, correspond generally to sites 131 which have bid to be included in such spot based on designation of certain desired keywords as noted above;
- a fourth display area 140 for displaying "organic" ad results which are individual entries 141 generated at least in part based on analyzing content of one or more of the organic search results.

From the embodiment of FIG. 1, those skilled in the art will appreciate that the present invention essentially extends the behavior of the prior art content based system (see FIG. 4A, FIG. 4B) so that the advertising materials which would otherwise be seen only after a click-through and page view of such sites is now identifiable and selectable within a search interface 100. This allows a blend or hybrid of both keyword and content based ads within a single interface.

Typically, of course, search interface 100 is devoid of content, but the invention is not restricted to such embodiments. Moreover while the preferred embodiment is presented in the form of a dedicated search interface, it will be understood that search interface 100 could be part of a larger website in which such interface is a component for assisting users locate information of interest (content) on such site, as opposed to the entire Internet. Most e-commerce operators include some form of search tool, and the present invention could be used in such environments as well.

In other embodiments of the invention, the location and number of organic ads could be varied with respect to the keyword/sponsored ads, so that, for example: (a) no keyword/sponsored ads 131 are used; (b) organic ads 141 are presented and blended as part of either sponsored search results area 130 or organic search results area 120; (c) the nature and number of keyword/sponsored ads 131 and organic ads 141 is balanced and determined on a case-by-case (search by search) basis based on demographics, the nature of the query, ad economics and incentives, relationships with third party sites which maintain a content based ad campaign with the search engine provider, etc. (d) the performance of keyword/pay for placement ads is compared against organic ads to determine which/how many of each is presented. For example for some topics keyword ads may be more "relevant" while for others organic ads may be more suitable and desirable. Other examples will be apparent to those skilled in the art from the teachings herein.

Figure 2:
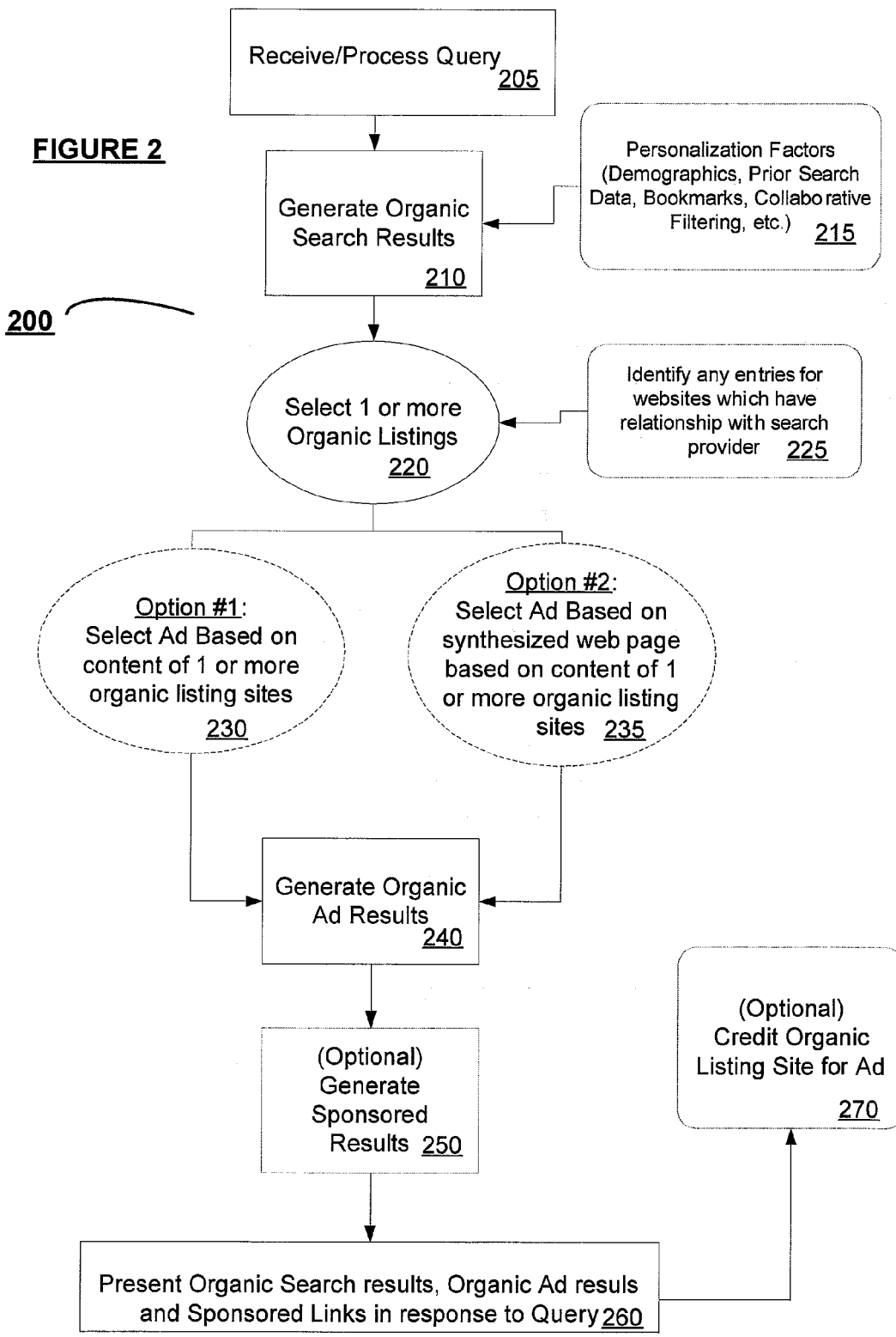
FIG. 2 is a flow chart illustrating the steps performed by an advertising selection and delivery process implemented in accordance with one exemplary embodiment of the present invention.

FIG. 2 is a flow chart illustrating the steps performed by an advertising selection and delivery process 200 implemented in accordance with a preferred embodiment of the present invention. In a first step 205, a conventional search query is received and processed, which may be directed to general Internet documents, selected website pages, RSS feeds, Blogs, etc. Organic search results are generated at step 210 in a manner as noted above (such as by PageRank or some other comparable algorithm). As indicated at step 215, the formulation of organic search results may be based on other user-specific factors, such as personalized data. The latter may include for example user demographics, prior search behavior (by the user and other users), user bookmarks, collaborative filtering techniques, the locale associated with the search/user, the time of day, the freshness/age of the contents of the web pages, and other well-known criteria. This description is not intended to be exhaustive, and other mechanisms for generating search results could also be employed.

At step 220, the organic search results are compiled and reviewed to determine a preliminary organic listing set. The organic search results, as noted above, include a URL identifying a webpage. This preliminary set is selected based on factors/criteria that can be varied as noted in step 225. For example, in a very simplified scenario, the preliminary organic listing set could be based solely on identifying whether there is an ongoing commercial relationship between a search site operator of search interface 100 and an entity associated with the particular webpage. As alluded to above in the ABC Realty example, typically this relationship can include an advertising delivery relationship based on content found at the ABC Realty website pages. In one embodiment therefore, the system would detect whether there is a preexisting "adsense" campaign associated with ABC Realty.

In the event where the system does detect such relationship, a first optional step 230 is then executed in which one or more "organic ads" are selected based on content of the underlying webpages retrieved in step 220. To do this, the system considers and/or predicts which particular ad would be served to a user in response to a click-through and/or page view of the webpage pointed to by the URL. This can be done easily since an ad engine can simply draw ads from an ad server configured for such website. In other words, with reference to FIG. 1, in the ABC Realty/XYZ Realty examples noted above, the preferred method presents/serves one or more organic ads 141 which are related and/or the same as ads 730 and 780 respectively. Accordingly an organic ad can be an actual ad selected from a preexisting stock for such webpage based on the actual content for such page, or a predicted ad based on a predicted content of such page. The stock of ads for a particular web page is in turn determined by evaluating among other things, targeting information specified for an ad, the topics determined to be present on the web page, the correlation of the two, and other pertinent parameters identified for example in U.S. Publication No. 2004/0059708 referenced herein. Again in a "content" based ad system, both the content of the webpage and the ad itself can be evaluated for a match.

In an alternative approach, in lieu of basing the decision on a single website within the search results, the organic ad could be derived from a content based ad served on a pseudo page precomputed for one or more collectives associated with the one or more of webpages, as explained below. This technique may allow for broader advertising sharing and more creative content correlations based on the relationship of the search result entries to other members of their respective collectives.

The key point in this part of the process is that the user of the search interface is presented with content related to the organic search result website pages without actually having to click-through to such sites through the organic search results presented. Consequently at the end of step 230 a first set of content based ads 141 are prepared for presentation within search interface 100 within an Organic Sponsored Search result area 140.

At step 235, as an alternative or supplemental approach, the preferred process can also base ads in a second option which are derived from a synthesized web page. The synthesized web page 150 (FIG. 1) is based on the content retrieved by the organic search results. Again a synthesized page 150 may be drawn entirely and aggregated from web pages (or portions thereof) in which there is a preexisting commercial relationship as noted above, or could be based on a top N list of pages, etc. In contrast, in other embodiments a synthesized page 150 may only be generated under conditions in which there is no entry 121 for which there is a prior relationship, to avoid a potential conflict with an existing business partner. Under any conditions, a synthesized web page 150 can be derived from, among other things, a term vector based on the text of the combined content of the selected webpages.

Term vector information for individual and groups of webpages can be derived and/or located for example, by creating a term vector database. For instance, a database could be constructed in accordance with the teachings of an article (available online at www9<dot>org/w9cdrom/159/159.html) entitled "The Term Vector Database: fast access to indexing terms for Web pages" by Stata et al. In such system the main function in the API takes a set of page identifiers and returns a set of vectors: tv_lookup(int n, const conn_id_t*pages, /*out*/tv_t*vectors). The function retrieves vectors for a set of URLs rather than a single one. Other similar suitable databases could be used, and search related data could be added to the synthetic page 150 on a search by search basis, again, depending on the topic of the search in a manner analogous to that discussed for step 225.

Thus, by extending the principles of Publication No. 2004/0059708 to Dean et al. to consider larger aggregate collections of web pages (instead of a single web page), a pseudo web page or synthetic web page 150 can be analyzed for content to determine the top M terms from the vector. An ad is then "delivered" to such synthetic page 150 within search interface 100 in a well-known manner such as described in Dean, even though, as can be seen in FIG. 1, such synthetic page 150 is preferably not displayed within such interface.

The other options noted in Dean can also be employed herein, such as by analyzing the page text to determine topics, frequency of words, weighing certain keywords, etc. Alternatively, metadata can be analyzed for the synthesized page as well. In yet another approach, the top N queries which result in references to the individual pages could be similarly compiled to determine a topic for the synthesized page. Other examples in addition to those taught by Dean will be apparent to those skilled in the art from the present teachings. For example a collaborative filtering algorithm or content filtering algorithm could be employed to determine other web pages which, although not appearing in organic search results 120, are nonetheless likely to contain relevant and related data to the entries 121 appearing therein. This can be done by either examining actual content for such other pages, or by examining user click-behavior collected during online Internet surfing sessions respectively. These secondary pages, therefore, could also be considered and presented as part of the synthetic/aggregate page 150. Link metrics for the pages could also be used, so that selected pages which are considered authoritative are included as well as part of synthesizing content page 150.

Figure 2A:
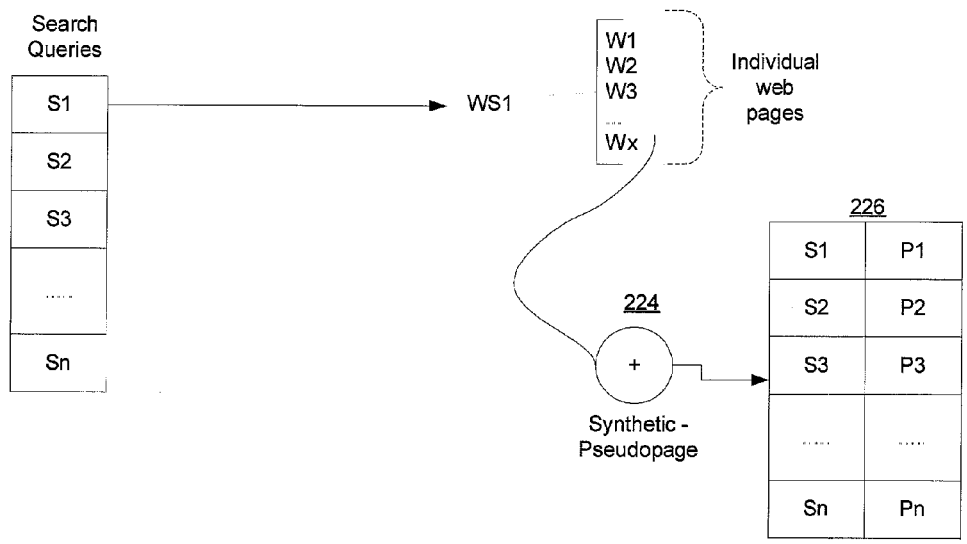
FIG. 2A illustrates generally how an index of synthetic pages can be precomputed/precompiled for a set of search queries.

To save time and to expedite processing, the synthesized web page can be precalculated in advance as shown in FIG. 2A based on studying prior search queries and result sets for common queries and stored in an index. For example, a search engine site may determine that for a set of top ranked searches {S1, S2, S3 ... Sn} (where Sk denotes a set of search terms) the corresponding set of ranked search results is {WS1, WS2, WS3 ... WSn} where Wk denotes the top N organic search results. A series of N precalculated/precomputed pseudo pages or synthetic pages Pn can be generated at 224 and stored in an index 226 which can be similarly tagged as above with corresponding organic search ads. In lieu of searches the system could also use one or more RSS feeds, Blogs, collectives of the same or other sources of content. The value of N of course can be varied as desired in accordance with performance requirements and capacity constraints.

Figure 2B:
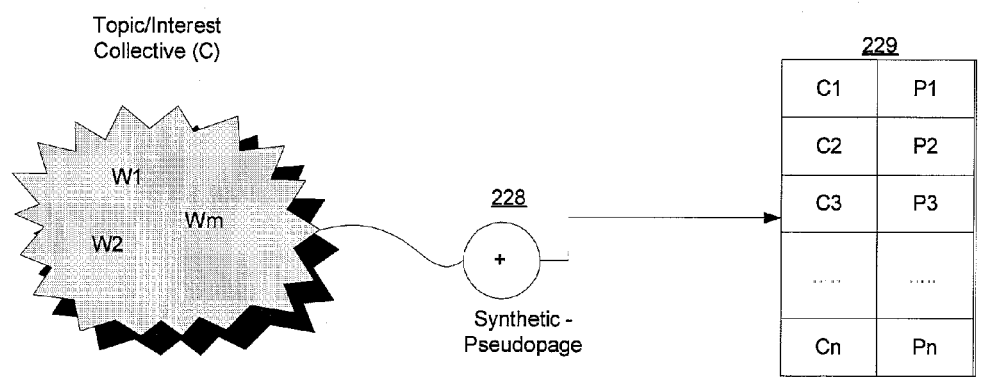
FIG. 2B depicts a website Collective based index of synthesized/collective pages for use in a content based advertising system.

As seen in FIG. 2B in some implementations the pseudo pages can be constructed based on collective content from one or more affiliated sites which can be part of an organized group, or collective. For example a set of separates sites (W1, W2, ... Wm) directed to a particular topic (or topics) may elect to be treated as a single aggregate entity or collective 227 for purposes of deriving a pseudo page 228. Again in some instances a set of RSS feeds, Blogs or other content sources could be used. This may be attractive in instances where the web sites prefer to display only limited (or no) advertising directly on their respective sites, but because of their popularity and significant Internet following prefer nonetheless to monetize their content in some capacity. These collectives can be organized and managed by the advertiser or search engine operator by topic or by profit sharing characteristics to encourage participation. In other words a search engine operator could manage different collectives in which there could be profit sharing for organic advertising revenues at different tiers. Accordingly the degree of revenue sharing could be adjusted based on the site traffic, general content, etc. The individual members of the collective would share any such revenues based on some proportional representation/status within organic search results, their contribution of content to the pseudo-page, or any other convenient metric. This approach would have the effect of allowing some sites with high traffic (but lesser content) to benefit from the content-based contribution of other sites with lower traffic but more relevant content (from a search engine perspective or ad serving program at least).

The collectives could similarly coordinate on the creation of pseudo pages or synthetic pages to be submitted to an index of pseudo pages 229 maintained by the search engine sites. The pseudo pages could be updated by the collective or the search engine operator at regular, predetermined intervals to maintain their relevance and freshness. By banding together the collectives have more bargaining leverage with advertising servers (such as search engine operators) so that they could secure favorable rates for members therein.

Other mechanisms for determining and precalculating the synthetic pages will be apparent to those skilled in the art.

In the end result of step 235, a second set of one or more organic ads is determined therefore based on the aggregate content calculated for the synthetic/aggregate search page. At step 240 these second set of ads are combined with any of the first set of ads generated during step 230 to form a final set of organic ad result which will be presented within search interface 100. For some embodiments the second set of organic ads may include content-related ads which were previously determined as well performing. In other words, in the aforementioned conventional keyword ad delivery campaigns used for sponsored search results, one factor that is commonly used is the click-through rate to increase or decrease the location of an ad within sponsored search results. This means that while a first advertiser may bid high on a particular keyword, a second advertiser bidding less can nonetheless secure a more prominent spot within the sponsored link results 140 by virtue of a higher click-through rate. While this has been typically restricted to sponsored search results, a similar approach could be used within the present invention as well in connection with content related ads. This in turn assists a search operator to significantly improve the overall click-through rate of ads within search interface 100 and optimizes advertising revenue.

As an alternative, or in addition to such content based ad which is derived from organic search results, an advertisement could be presented based on keywords associated with one or more identified topics determined for the synthetic page or pseudo page. As before, advertisers could bid on keywords for which they want to show ads. A natural language engine or other artificial intelligence classifier parses the pseudo page to map the contents to one or more predetermined topics. These topics can be actual keywords, or can be mapped to keywords as necessary to determine a match with a particular advertiser. In this manner an advertiser can participate in a secondary presentation of keyword based ads within the search interface that is determined and derived separately from a keyword based ad that is based on a conventional search query. Other examples will be apparent to those skilled in the art.

At step 250 any conventional "sponsored" results are then computed and added as well to be included in search interface 100. Some embodiments may include a feature in which users are allowed to "opt out" of sponsored link results 130 in favor of only organic ad results 140. In any event the combined results (such as they are) are then displayed in response to the query as noted in step 260.

An additional optional step 270 is noted as well, in which a search engine operator may in fact give a credit of some form to one or more of the underlying websites (or collective) which provided a webpage (or pages) used in the synthetic web page 150. In the case of an "adsense" type relationship, for example, an ad deliverer may give partial or complete credit to the underlying website owner (or collective associated therewith) when an ad associated with such page is selected. Thus, in the example above, in the event a user selects an ad 141 for wwwdotsuremove.com, the ABC Realty site (or its associated collective) would receive credit as if the ad had been served on such site instead. In this manner the search interface in fact operates as a form of proxy for the underlying content site(s). Again the credit could be adjusted by other factors particular to the search topic and relationship between website and search operators. Furthermore as alluded to above, the credit is optional and may not be awarded in some cases. Other examples will be apparent to those skilled in the art.

One advantage of using search interface 100 to present content ads based on the underlying websites is that it allows for a greater impression rate across a universe of Internet users. In other words, even a particularly prominent and reputable site for a topic A may in fact have only a relatively small audience for their content. Allowing their related content ads to be served within a search interface 100 allows for greater scaling of such entity's presence across the World Wide Web. Moreover it permits for broader and more efficient testing of the utility and performance of algorithms for content ads particular to that site. Balanced against this of course is the fact that such ads are competing against other ads within portions 130 and 140 of the Interface, and so this needs to be taken into account.

In some embodiments a search site operator could bias or skew the distribution and selection of sponsored search results 130 and organic ad results 140 at different times, or to selected users, or for different topics to identify content related algorithms most suitable for ads to be presented at different content sites. In some instances the users can be selected based on their identified receptiveness and relative enhanced interactivity with online ads as calculated against their peers. In the case presented in FIG. 1, for example, a search site operator may elect to intentionally omit sponsored search results 130 or alter the ordering of sponsored search results 130 and organic ads 140 for the purpose of identifying, developing and testing optimized content related ads for third party websites. Thus the identification and verification of future well-performing ads can be predicted by first measuring their performance on a larger scale within a search interface 100. For some embodiments an ad delivery provider can monitor the organic search results to identify potential websites that may benefit from a content based ad delivery mechanism (i.e., such as AdSense). The ad delivery provider can then "test out" various content based ads to determine and verify their performance. The results can be presented to the third party website for purposes of demonstrating proven viability, accuracy and performance of advertising materials to solicit their participation in an advertising scheme (i.e., such as Adsense) and before providing them with actual ads during page views of such third party site.

FIG. 5 illustrates a preferred embodiment of an advertising delivery system 500 constructed in accordance with the present invention. It will be appreciated that the types of systems which can embody the present inventions can include a variety of conventional hardware platforms known in the art, including data processing equipment and computers with a wide range of computing/storage resources and capabilities. Accordingly, the details of such software and hardware implementations are not material except as discussed herein with reference to specific aspects of the invention, and they will vary significantly from application to application based on a desired performance.

The system is generally composed of several components including a Network 502, through which a conventional client computing machine (and/or a browser) 501 connects to a conventional network device (such as a server) 510. It will be understood by those skilled in the art that other components may be connected to Network 502, and that not all connections shown need to be active at all times. Network 502 is preferably the Internet, but could be any implemented in any variety of commonly used architectures, including WAN, LAN, etc. A Network connection is a conventional dial-up and/or network connections, such as from analog/digital modems, cable modems, satellite connections, etc., between any conventional network device and an Internet Service Provider in combination with browser software such as Netscape Navigator, Microsoft Internet Explorer or AOL.

In most applications, Customer Device 501 will be typically desk top computers, laptop computers, personal digital assistants (PDAs), cell phones, or some form of computing device suitable for providing queries and supporting the presentation of search results and advertising in a manner shown in a search interface 100 (FIG. 1).

Server Network Device 510 is typically one more network servers. Of course, other structures and architectures may be more suitable on a case by case basis for any particular implementation of the present inventions, and so the present inventions are not limited in this respect. Software elements of the present invention typically will be custom tailored for a particular application, but preferably will include some common features, including the following.

Operating on System Network Device 510 are the following software routines and/or supporting structures, which implement a form of search/advertising delivery system. First, a Search Engine module 521 generates search results 523 in a manner described above in connection with step 210, 215 (FIG. 2). The results are derived by reference to a set of web pages maintained in a database 525.

A keyword based ad generator module 524 presents ads within the sponsored link portion 130 of interface 100, again in a conventional manner described above in connection with step 250 (FIG. 2). A Search Result Content Synthesis Logic module 528 implements the procedures noted earlier for steps 235 (FIG. 2) to create a synthesized web page based on the parameters identified above. Again, as noted above in FIGS. 2A and 2B, these may be precompiled and stored within an index. The information used by this module includes ads derived from Web Page Content Related Ad Generator module 527 which also performs the operations described with respect to step 230 (FIG. 2). These modules interface to Search Page Content Related Ad Generator 529 which includes routines for performing the operations noted in step 240 (FIG. 2). The information from all modules is then combined and presented by an interface module 522 and in accordance with the techniques discussed above for step 260 (FIG. 2). An accounting module 526 is responsible for adjusting and providing credits as noted above for as discussed for step 270 (FIG. 2). A testing module 530 implements the operations discussed below in connection with FIG. 6.

It will be apparent to those skilled in the art that what is set forth herein is not the entire set of software modules that can be used, or an exhaustive list of all operations executed by such modules. It is expected, in fact, that other features will be added by system operators in accordance with customer preferences and/or system performance requirements.

Furthermore it will be apparent to those skilled in the art that a service provider system implementing the present invention may not include all of the modules/databases as noted above, depending on the needs, requirements or desires of its subscribers, and other technical limitations. Finally, while not explicitly shown or described herein, the details of the various software routines, executable code, etc., required to effectuate the functionality discussed above in such modules are not material to the present invention, and may be implemented in any number of ways known to those skilled in the art based on the present description.

The advantages of the present invention, in addition to those identified include:

A search site operator or other operator of an ad delivery system can create and present ads even for search results that would otherwise perhaps be devoid of sponsored links (i.e., based on keywords or pay for placement alone). In some cases there is no bidding for a keyword or placement, but there may be a content relevant, servable ad for the user query, thus reducing underserving of ads;

Maximizes available real estate of the interface (particularly in situations where there are few keyword based ads);

Avoids problem of presenting only ads (keyword based) which are likely to be overserved and thus irrelevant to user queries;

Allows web site operators (and collectives) to (potentially) derive additional ad related revenue even in the absence of an actual visit to the entity's website. Thus by creating even more useful and creative content to build up an organic rating, a website operator and/or collective can simultaneously increase the chances of seeing additional returns from proxied ad results provided by a more broadly used search engine;

Search engine operators conversely can (potentially) piggyback off the content of site operators to provide more relevant ads within a search context; in this respect, therefore, a search site is seen as imitating the behavior of a full content site;

Allows search engine operator to override blocking/restrictions which may be maintained by affiliates of an advertising system. For example, in the AdSense system, a content owner partner (e.g., a Website/Web page publisher) can easily block entire broad or narrow categories of ads to be presented within the partner's website, and can specify objectionable ad content or targeting. Concepts may be associated with a property and ads related to those concepts may be blocked for the given property. Further, terms may be associated with a property and ads including any of the terms may be blocked for the given property. This is discussed in detail in U.S. Patent Publication No. 2005/0055271 which is incorporated by reference herein. By using the present invention a search engine operator or ad delivery provider can avoid the problem of presenting an ad which is otherwise objectionable, because the third party site is not actually seen during the user session.

Figure 6:
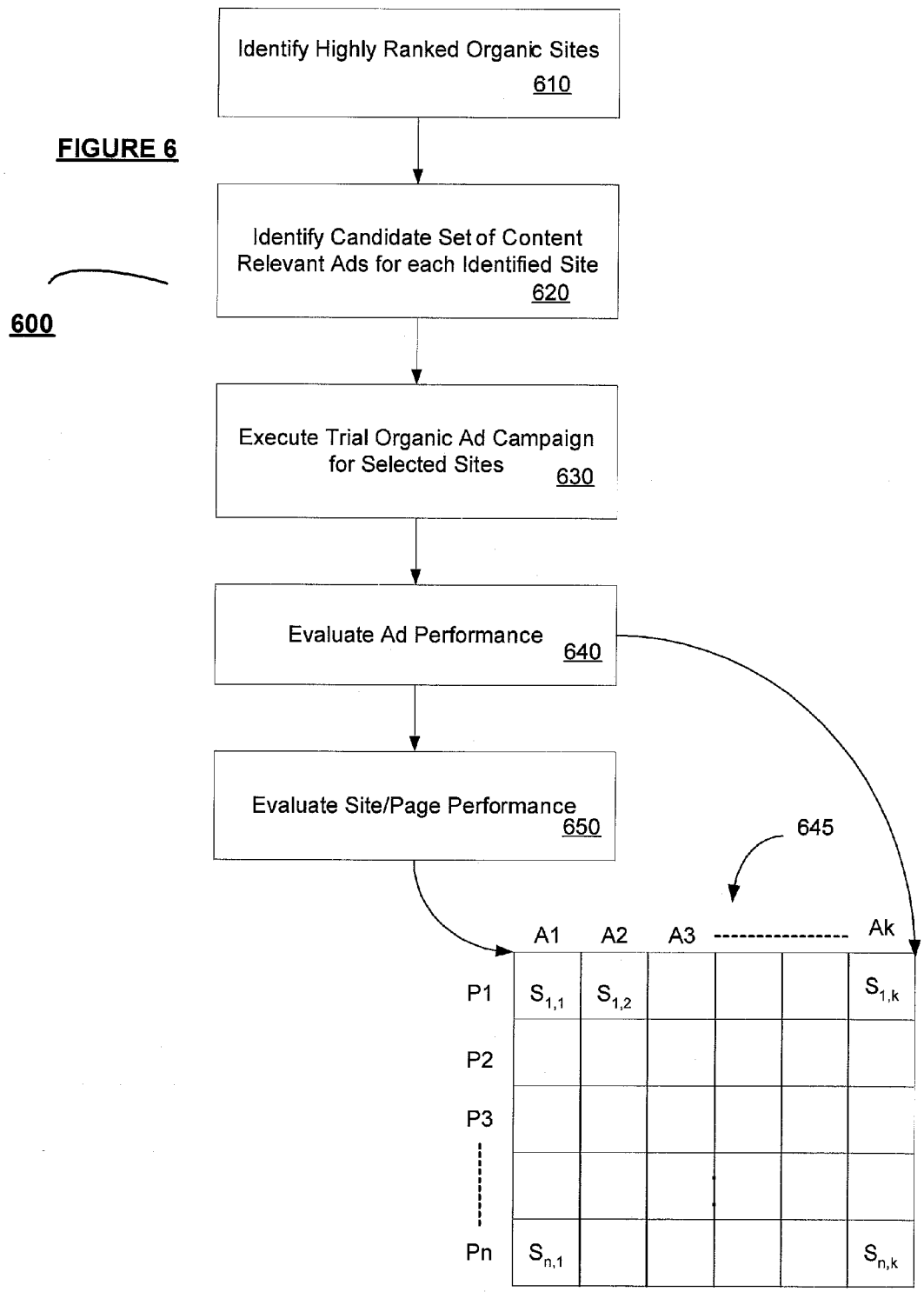
FIG. 6 illustrates a preferred embodiment of an advertising testing method in accordance with the present invention.

Finally, the present invention can be used so that search engine/ad delivery operators (i.e., such as Google, MSFT, Yahoo!) can test out content-related ads in advance of their submission to third parties, or as part of soliciting advertising budgets from such entities; this latter point is illustrated in more detail in FIG. 6 which corresponds to an advertising system tester/prequalifier. As seen therein, an advertising system operator first analyzes organic search results at step 610 to identify websites which tend to score highly and are retrieved frequently in user queries. For each of these websites, the advertising system operator selects a stock of ads in step 620 in a manner such as depicted in U.S. Publication No. 2004/0059708. In step 630, a mock/test advertising campaign is conducted for each website, by presenting organic ads (as noted above) related to such site within search interface 100 (FIG. 1). As noted earlier, the organic ads can be presented whenever a user query results in retrieval of organic search results which include the targeted webpage. The selection of the particular stock of ads to be shown can again be targeted and varied in accordance with a variety of known formulas otherwise applicable to content delivered advertising to conventional web pages as known in the art. Furthermore, in some cases the competing Sponsored Link ads can be removed as potential "distracters" selectively on a user by user basis, query by query basis, at certain times, randomly or by some other means. This can help to isolate and better identify the true performance of particular ads.

Regardless of the campaign specifics, the performance (e.g., click through rate, conversion rate, etc.) of one or more organic ads can thus be determined at step 640 through rigorous submission and testing of ads. This allows an ad delivery system operator to identify and predict future well performing ads in advance of their submission to actual content site campaigns (i.e., such as Adsense). As a corollary to this the ad performance data can be mined to identify an appropriate future mix of advertising suppliers for specific content sites to maximize advertising revenue sharing.

In the end, for example, a performance table 645 of relative performances by individual ads and sites can be compiled; the entries can correspond to a scored value rated by the ad delivery operator based on their own particular criteria. The rows and columns of table 645 can be sorted and correlated so that the performance of ads can be ranked for particular websites grouped within a common topic area (i.e., medicine, law, food, electronic goods, and the like).

Conversely, in step 650, an ad delivery system operator can also determine the most productive prospects from a set/class of websites within a common topic area, as measured for example by click-through rates on content related ads. The prospects can be sorted and potential advertising partners identified to the extent they do not already have a relationship with the ad delivery system operator.

Consequently, in the end analysis the ad delivery system operator can identify both the best performing ads and the best performing webpages; this can be broken down, if desired, by topic. This information is extremely valuable, because any marketing and sales resources can now target the more profitable candidates in both sets. Moreover this data could be used for purposes of identifying potential groupings and members of site collectives which would be employed as noted above for presenting ads based on collective content pseudo pages.

The campaign can be set to a predefined amount of time (i.e., days, weeks, etc.), for certain times of day, and/or for a certain number of impressions, etc. Ad campaigns are well-known in the art, so other approaches will be apparent to those skilled in the art.

The advantages of the above are numerous, and include the fact that ad delivery system operator can now screen, evaluate and identify key websites, key content related ads, etc., without ever having to involve the third party owner of a particular site. In the case of a Google sponsored program, for example, this eliminates the inconvenience of requiring the third party operator to set up a separate "Adsense" campaign. Instead, the search site operator (i.e., such as Google) can set up ad campaigns automatically to run and determine profitable site partners and ads in advance. For example, Google already uses a search robot known as "Mediabot" which could be used for such scouting purpose. This spider/crawling engine is already configured to automatically check content at affiliate sites for purposes of determining content based ads. Such engine could be easily modified to perform the steps noted above of checking those particular sites which are determined to be candidate webpages for content based advertising.

This also avoids the problem of some sites being potentially hesitant about the desirability of running ads at their site, since the test ads are not in fact presented within their respective webpages. The ad delivery system operator can thus market their services to the third party operator (or larger collectives as explained earlier) based on the actual analysis for a particular webpage. The ads can also be tested on a much larger scale, since page views of search engine operators (such as Google) tend to be orders of magnitude larger than for dedicated content sites.

Moreover the invention eliminates guesswork on which ads, websites and combinations are likely to yield highest advertising revenue. By completing an entire campaign on behalf of a target partner in advance, and presenting real-world data demonstrating the viability and projected profitability of the advertising campaign, the target webpage partner (or collective) is far more likely to adopt a content related advertising system at their respective webpage.

Ad suppliers, too, can benefit in advance from knowing which ads are better performing with respect to certain topic related webpages. This knowledge of course is useful for marketing and selling ads to webpage operators in related industries. Other benefits will be apparent to those skilled in the art.

It will be understood by those skilled in the art that the above is merely an example of an ad delivery system/method and that countless variations on the above can be implemented in accordance with the present teachings. A number of other conventional steps that would be included in a commercial application have been omitted, as well, to better emphasize the present teachings.

In addition, while presented in the context of a search engine interface, the invention could be used in other environments where ads can be presented in response to content of retrieved search results. Search features are common across many e-commerce sites, including Amazon, eBay, etc., and such sites could clearly benefit from such techniques. For example, in an e-commerce site, an ad related to content of one or more retrieved items (such as books, CDs, DVDs or other goods) could be presented. In an auction application an ad could be presented that is related to content of auction items returned in response to a search query. In a set top box application an ad could be related, for example, to the content of programs retrieved in response to a search query. Similar examples will be apparent to those skilled in the art.

Furthermore it will be apparent that the present invention could be used in connection with so-called "Blog" pages and RSS (Really Simple Syndication) type Feeds/aggregators as alluded to above, or collectives thereof. For example, Feedster (wwwdotfeedster.com) allows placement of advertisements in RSS Feeds. These ads are determined and customized based on the particular RSS feed, subscriber, etc. One embodiment of the present invention could include processing an RSS feed (or feeds) on a predetermined periodic basis to generate a nominal set of organic search results related to the particular RSS feed (or feed collective). The search could be generated from a variety of means, including by determining one or more topics associated with the content of the feed (or feed collective) in a manner similar to that described above. From these organic search results a set of content related ads could be derived in the manner described above. This set in turn could then be used as ad inserts into the RSS Feed in accordance with the prior art. In this scenario the end viewer of ads in fact does not need to interact with a search interface or even conduct a query per se since such is done automatically for him/her based on the content of the feed. Some companies also allow "searching" of Blogs, and the present invention can clearly be used to determine appropriate content related ads by analyzing organic "blog" page search results.

In a Blog (or even a regular webpage) application, a similar approach could be used in which a content (and or links) of the page (or collection of pages from a Blog collective) is analyzed to determine one or more topics associated with the page(s). This could be performed using a natural language classifier or any other suitable tool. A nominal organic search result list is then generated based on the identified topic(s) of the document and the list is then mined to determine appropriate ads. This type of approach could be used as an adjunct or supplement to any other ad serving algorithm cooperating with the particular web page. Thus a "constructive" search is effectuated based on the document in question, which is then used to develop either a content based ad (such as done with Adsense) or for which advertisers could bid for ads based on the keywords identified by the topic for the page in question.

The above descriptions are intended as merely illustrative embodiments of the proposed inventions. It is understood that the protection afforded the present invention also comprehends and extends to embodiments different from those above, but which fall within the scope of the present claims.

What is claimed is:

1. A method of determining advertising information which is implemented by a computer usable medium executing on a computing system comprising:

identifying search results corresponding to a search query generated automatically with the computing system;

wherein said search query includes keywords generated automatically based on identifying first topics derived from content and/or links of a first webpage;

further wherein said search results include search data associated with one or more electronic documents from one or more second webpages separate from said first webpage;

analyzing at least a first one of the one or more electronic documents of said search data with the computing system to identify or derive a set of one or more second topics associated with said search results;

automatically identifying an advertisement for said search results relevant to the at least first one of the one or more electronic documents of said search data with the computing system based on said set of one or more second topics;

wherein said advertisement is not determined based exclusively by matching keywords presented in said search query.

2. The method of claim 1, wherein said search query is generated automatically in part also based on content of a Really Simple Syndication feed.

3. The method of claim 1, wherein first webpage is a web blog content page.

4. The method of claim 1 wherein said search query also includes keywords provided by a user within a search interface.

5. The method of claim 4, wherein said search results are presented with said advertisement along with keyword ads and/or pay for placement ads within said search interface.

6. The method of claim 1, wherein said search query is automatically generated and adapted for locating relevant data in web logs (Blogs).

7. The method of claim 1, wherein said search query is automatically generated and adapted for locating relevant data in Really Simple Syndication feeds.

8. The method of claim 1, further including a step: presenting said advertisement within a search interface.

9. The method of claim 8, further including a step: automatically measuring a performance of said advertisement based at least in part on user interaction with said advertisement.

10. The method of claim 8, further including a step: automatically measuring a performance of said one or more second webpages as potential sites for said advertisement based at least in part on user interaction with said advertisement.

11. The method of claim 1, wherein a set of advertisements associated with a particular target webpage is automatically tested to determine a performance and/or ranking for individual ones of said advertisements before presenting such advertisements on said particular target webpage.

12. The method of claim 11, wherein said set of advertisements associated with said particular target webpage are presented within a search interface without the presence of other advertisements.

13. The method of claim 11, wherein said set of advertisements associated with said particular target webpage are automatically presented on a query-by-query basis as part of an advertising test campaign, including by considering at least one or more of: a) an identity of a user; b) a time of day; c) a duration period of the advertising test campaign; d) user demographics; e) a topic of said query; f) other advertisements presented within a search interface.

14. The method of claim 1, further including a step: matching said one or more first topics to one or more second keywords, and presenting an additional advertisement associated with said one or more second keywords with said advertisement.

15. A method of presenting advertising information which is implemented by a computer usable medium executing on a computing system and to an electronic interface comprising:

providing search results with the computing system in response to a search query within a search webpage;

wherein said search results include references to one or more separate webpages;

processing content extracted or derived from selected ones of said one or more separate webpages with the computing system to compile a separate pseudo web page for said search results;

identifying one or more topics for said pseudo web page with the computing system;

automatically presenting at least one first advertisement with the computing system within said search page along with said search results based on said one or more topics;

wherein said at least one advertisement is not based exclusively on matching keywords presented in said search query.

16. The method of claim 15 wherein said selected ones of said one or more separate webpages are determined by based on an existing advertising relationship between an advertising system operator and operators of said separate webpages.

17. The method of claim 15, further including a step: matching said one or more first topics to one or more second keywords in said search query, and presenting an additional advertisement associated with said one or more second keywords with said at least one advertisement.

18. The method of claim 15 wherein said pseudopage is precomputed based on prior search queries.

19. The method of claim 18 wherein said pseudopage is created by said collective of associated webpages and stored in an index maintained by a separate search engine site.

20. The method of claim 15 wherein said pseudopage is precomputed based on content taken from a collective of associated webpages having content directed to said one or more topics and stored in part of a search engine index.

21. The method of claim 15 wherein said pseudopage is analyzed to rank a set of terms present in said one or more separate webpages.

22. The method of claim 15 wherein said pseudopage is analyzed to determine a term vector based on the text of the combined content of the selected webpages.

23. A non-transitory computer readable medium or media containing one or more sets of computer-readable instructions executable on a first computing device to cause the first computing device to, generate a search query automatically with keywords based on identifying first topics derived from content and/or links of a first webpage;

identify search results corresponding to said automatically generated search query;

wherein said search results include search data associated with one or more electronic documents from one or more second webpages;

analyze at least a first one of the one or more electronic documents to identify or derive a set of one or more second topics associated therewith with said search results; and identify an advertisement relevant to the at least first one of the one or more electronic documents based on said set of one or more second topics to be associated with said search results;

wherein said advertisement is not based exclusively on matching keywords presented in said search query.

24. A non-transitory computer-readable medium or media containing one or more sets of computer-readable instructions that, when executed by a computer or computers, instantiate an application or applications comprising:
- means for providing search results in response to a search query within a search webpage;
- wherein said search results include references to one or more separate webpages; a web page compiler adapted to process content extracted from selected ones of said one or more separate webpages to compile a separate pseudo web page for said search results;
- means for identifying one or more topics for said pseudo web page; and
- means for presenting at least one first advertisement within said search page along with said search results based on said one or more topics;
- wherein said at least one first advertisement is not based exclusively on matching keywords presented in said search query.

* * * * *